United States Patent
Mizuta et al.

(10) Patent No.: US 11,028,224 B2
(45) Date of Patent: Jun. 8, 2021

(54) MONOMER MIXTURE AND CURABLE COMPOSITION CONTAINING SAME

(71) Applicant: DAICEL CORPORATION, Osaka (JP)

(72) Inventors: Tomoya Mizuta, Tokyo (JP); Keizo Inoue, Tokyo (JP)

(73) Assignee: DAICEL CORPORATION, Osaka (JP)

(*) Notice: Subject to any disclaimer, the term of this patent is extended or adjusted under 35 U.S.C. 154(b) by 0 days.

(21) Appl. No.: 16/622,222

(22) PCT Filed: Jan. 25, 2019

(86) PCT No.: PCT/JP2019/002386
§ 371 (c)(1),
(2) Date: Dec. 12, 2019

(87) PCT Pub. No.: WO2019/151123
PCT Pub. Date: Aug. 8, 2019

(65) Prior Publication Data
US 2020/0377651 A1 Dec. 3, 2020

(30) Foreign Application Priority Data
Feb. 5, 2018 (JP) .............................. JP2018-018095

(51) Int. Cl.
| | | |
|---|---|---|
| C08G 65/18 | (2006.01) | |
| C08F 16/32 | (2006.01) | |
| C09D 11/322 | (2014.01) | |
| C09J 171/02 | (2006.01) | |
| C08G 59/24 | (2006.01) | |

(52) U.S. Cl.
CPC .............. *C08G 65/18* (2013.01); *C08F 16/32* (2013.01); *C08G 59/24* (2013.01); *C09D 11/322* (2013.01); *C09J 171/02* (2013.01)

(58) Field of Classification Search
CPC ......... C08G 65/18; C08G 59/24; C08F 16/32; C08F 16/26; C09D 11/322; C09D 1/30; C09J 191/02
See application file for complete search history.

(56) References Cited

U.S. PATENT DOCUMENTS

2017/0158812 A1* 6/2017 Mizuta ................... C09D 11/30

FOREIGN PATENT DOCUMENTS

| JP | 2003-327899 A | 11/2003 |
|---|---|---|
| JP | 3893833 B2 | 3/2007 |
| JP | 2007-302808 A | 11/2007 |
| JP | 2016-27127 A | 2/2016 |
| JP | 2017-115072 A | 6/2017 |
| JP | 2017-115073 A | 6/2017 |
| JP | 2017-115074 A | 6/2017 |
| JP | 2019-025904 A | 2/2019 |
| JP | 2019-026820 A | 2/2019 |
| WO | WO2015199093 | * 12/2015 ............... B41J 2/01 |

OTHER PUBLICATIONS

European Communication pursuant to Article 94(3) EPC for European Application No. 19747589.0, dated Oct. 30, 2020.
Extended European Search Report dated May 4, 2020, issued in counterpart European Patent Application No. 19747589.0.
Decision to Grant a Patent dated Oct. 15, 2019, issued in JP 2019-545812.
International Search Report dated Apr. 23, 2019 issued in PCT/JP2019/002386 (Form PCT/ISA/210).
Written Opinion of the International Searching Authority dated Apr. 23, 2019 issued in PCT/JP2019/002386 (Form PCT/ISA/237).

* cited by examiner

*Primary Examiner* — Jessica M Roswell
(74) *Attorney, Agent, or Firm* — Birch, Stewart, Kolasch & Birch, LLP

(57) ABSTRACT

The present invention provides a monomer mixture that rapidly cures even in high humidity environments, and is useful as a raw material for a curable composition that forms a cured product having excellent adhesion to metals and glass, as well as of course to paper and plastic.

The monomer mixture according to an embodiment of the present invention contains two or more types of cationically polymerizable monomers. The monomer mixture contains, as the cationically polymerizable monomers, a compound (A) having a vinyl ether group and a hydroxyl group; a compound (B) having an oxetanyl group and a hydroxyl group; and a compound (C) represented by Formula (c) below. A total content of the compound (A), the compound (B), and the compound (C) is 50 wt. % or greater of the total amount of the monomer mixture, and a content [A] of the compound (A) and a content [B] of the compound (B) satisfy Relationship (1) below.

$$A/(A+B) \geq 0.3 \quad (1)$$

[Chemical 1]

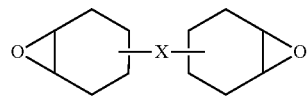

(c)

12 Claims, No Drawings

MONOMER MIXTURE AND CURABLE COMPOSITION CONTAINING SAME

TECHNICAL FIELD

The present invention relates to a monomer mixture and a curable composition containing the same. The present application claims priority from JP 2018-018095 filed in Japan on Feb. 5, 2018, the content of which is incorporated herein.

BACKGROUND ART

Inkjet recording method, in which printing is performed by jetting ink droplets onto a recording medium to form recording dots, does not require master plates and is advantageously used in printing applications that requires high-variety and low-volume printing. As the inkjet ink used in the inkjet recording method, cationically curable inks and radically curable inks are known.

The radically curable inks have been used often because of their rapid curability and a wide variety of monomer types. However, the inkjet recording method uses an ink having low viscosity from the viewpoint of discharge properties, and oxygen in the air readily diffuses/migrates into such ink. Furthermore, because such ink is printed as small droplets, the surface area of the ink tends to be greater, and the ink is readily exposed to oxygen. As a result, curing inhibition due to oxygen is significant and leads to problems such as printing blur, or persistence of a large amount of unreacted monomers, which causes a bad odor. Furthermore, another problem is low adhesion to a substrate, and it is necessary to process a substrate surface to enhance the adhesion of such ink.

On the other hand, cationically curable inks are not subjected to curing inhibition by oxygen. Furthermore, the cationically curable inks are superior in adhesion to a substrate compared to a radically curable ink. Patent Document 1 describes that a cationically curable composition containing an alicyclic epoxy compound, a di- or tri-vinyl ether compound, and 3-alkyl-3-hydroxyalkyloxetane as monomers has low viscosity, and when the cationically curable composition is used as an inkjet ink, the cationically curable composition exhibits excellent discharge properties, is rapidly cured upon ultraviolet light irradiation, exhibits excellent substrate adhesion, and forms a cured product having a high hardness.

CITATION LIST

Patent Document

Patent Document 1: JP 3893833 B

SUMMARY OF INVENTION

Technical Problem

However, the cured product of the cationically curable composition described in Patent Document 1 has low adhesion to metals and/or glass. To enhance the adhesion, surface-processing treatment, such as primer treatment, needs to be performed on the metals and/or glass. Furthermore, curing inhibition is found to be significant in high humidity environments with a relative humidity of 50% or higher.

Therefore, an object of the present invention is to provide a monomer mixture that rapidly cures even in high humidity environments and is useful as a raw material for a curable composition that forms a cured product having excellent adhesion to metals and glass, as well as of course to paper and plastic.

Another object of the present invention is to provide a curable composition containing the monomer mixture and a curing catalyst. Another object of the present invention is to provide a curable composition that is useful as an ultraviolet-curable inkjet ink, a coating agent, or an adhesive agent.

Another object of the present invention is to provide a cured product having excellent adhesion to metals and glass, as well as of course to paper and plastic.

Another object of the present invention is to provide a cured product or molded article of the curable composition.

Another object of the present invention is to provide a structure provided with a cured product of the curable composition on a substrate.

Solution to Problem

As a result of diligent research to solve the above problems, the present inventors discovered that a monomer mixture containing a specific proportion of a specific cationically polymerizable monomer exhibits excellent curing sensitivity when a curing catalyst is added thereto, and is also rapidly cured even in high humidity environments when irradiated with ultraviolet light, and that a cured product excelling in adhesion to metals and glass, as well as of course to paper and plastics, can be formed. The present invention was completed based on these findings.

Namely, the present invention provides a monomer mixture that contains two or more types of cationically polymerizable monomers, the monomer mixture containing, as the cationically polymerizable monomers, a compound (A) having a vinyl ether group and a hydroxyl group; a compound (B) having an oxetanyl group and a hydroxyl group; and a compound (C) represented by Formula (c) below:

[Chemical 1]

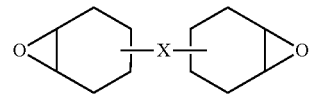

(c)

where X denotes a single bond or a linking group; wherein a total content of the compound (A), the compound (B), and the compound (C) is 50 wt. % or greater of the total amount of the monomer mixture, and a content [A] of the compound (A) and a content [B] of the compound (B) satisfy Relationship (1) below.

$$A/(A+B) \geq 0.3 \qquad (1)$$

The present invention also provides the monomer mixture, further containing, as a cationically polymerizable monomer, a compound (D) having two or more vinyl ether groups bonded to an alicyclic skeleton or a non-aromatic heterocyclic skeleton (excluding compounds having hydroxyl groups), the content of the compound (D) being from 1 to 10 wt. % of the total amount of the monomer mixture.

The present invention also provides the monomer mixture, further containing, as a cationically polymerizable monomer, a compound (E) having two or more oxetanyl groups (excluding compounds having hydroxyl groups), the content of the compound (E) being from 15 to 40 wt. % of the total amount of the monomer mixture, The present invention also provides a curable composition containing the monomer mixture and a curing catalyst.

The present invention also provides the curable composition, containing a sensitizer, or a sensitizer and a sensitization auxiliary agent.

The present invention also provides the curable composition, containing a coloring material.

The present invention also provides the curable composition, containing a dispersant.

The present invention also provides the curable composition, the composition being an ultraviolet-curable inkjet ink.

The present invention also provides the curable composition, the composition being a coating agent.

The present invention also provides the curable composition, the composition being an adhesive agent.

The present invention also provides a cured product of the curable composition.

The present invention also provides a cured product of a curable composition containing a cationically polymerizable monomer, wherein adhesion to paper substrates, plastic substrates, metal substrates, and glass substrates is rated grade 0 to 2 in a 6-grade classification test through a cross-cut method in accordance with JIS K 5600-5-6.

The present invention also provides a molded article formed from the cured product.

The present invention also provides a method of producing a molded article including: ejecting the curable composition described above using inkjet method, then curing the ejected curable composition, and forming a molded article from a cured product of the curable composition.

The present invention also provides a structure having the cured product described above on a substrate surface.

Note that in the present invention, an "oxetanyl group" is a group having a 4-membered saturated aliphatic hydrocarbon ring structure containing one oxygen atom, and an "epoxy group" is a group having a 3-membered saturated aliphatic hydrocarbon ring structure containing one oxygen atom.

Advantageous Effects of Invention

The curable composition obtained by blending a curing catalyst into the monomer mixture according to an embodiment of the present invention having the configuration above has low viscosity and excellent coatability prior to irradiating with ultraviolet light, can be rapidly cured even in high humidity environments by irradiation with ultraviolet light, and can form a cured product having excellent adhesion to metals or glass, as well as to, of course, paper and plastic. Therefore, the curable composition can be suitably used as ultraviolet-curable inkjet inks, coating agents, and adhesive agents. In addition, the monomer mixture according to an embodiment of the present invention is extremely useful as a raw material for a curable composition provided with the characteristics described above.

For example, when the curable composition is used as an ultraviolet-curable inkjet ink, the curable composition excels in discharge properties with low viscosity, and can be applied directly to a metal or glass surface even in high humidity conditions, and then subsequently cured to thereby form an ink coating that excels in adhesion with extremely high precision.

The cured product according to an embodiment of the present invention exhibits excellent adhesion to metals and glass, as well as to of course paper and plastic. Therefore, when the cured product according to an embodiment of the present invention is used, a structure in which a coating film or a molded article made from the cured product according to an embodiment of the present invention is affixed to a metal or glass substrate can be formed.

DESCRIPTION OF EMBODIMENTS

Monomer Mixture

The monomer mixture according to an embodiment of the present invention contains two or more types of cationically polymerizable monomers, and contains, as the cationically polymerizable monomers: a compound (A) having a vinyl ether group and a hydroxyl group; a compound (B) having an oxetanyl group and a hydroxyl group; and a compound (C) represented by Formula (c).

The monomer mixture according to an embodiment of the present invention may further contain a compound (D) having two or more vinyl ether groups bonded to an alicyclic skeleton or a non-aromatic heterocyclic skeleton and not having a hydroxyl group, and may also contain a compound (E) having two or more oxetanyl groups and no hydroxyl groups.

Compound (A)

The compound (A) is a compound having at least one vinyl ether group and at least one hydroxyl group, and is a cationically polymerizable monomer. The cured product formed by curing the curable composition containing the compound (A) exhibits a high hardness and toughness because the vinyl ether group and the hydroxyl group of the compound (A) polymerize to form a highly cross-linked structure.

Among such compounds (A), a compound (a) having one vinyl ether group and one hydroxyl group per molecule is preferable as the compound (A) from the viewpoints of increasing the hardness, reducing the curing shrinkage, and improving the adhesion of the formed cured product.

The compound (a) is represented by the following formula, for example:

$$\text{HO}—\text{R}^a—\text{CH}=\text{CH}_2 \qquad (a\text{-}1)$$

where $R^a$ represents a divalent hydrocarbon group, a divalent heterocyclic group, or a divalent group having these bonded to each other through a single bond or a linking group.

The hydrocarbon group includes aliphatic hydrocarbon groups, alicyclic hydrocarbon groups, and aromatic hydrocarbon groups.

Examples of the divalent aliphatic hydrocarbon group include straight-chain or branched alkylene groups having from 1 to 18 carbons, such as a methylene group, a methylmethylene group, a dimethylmethylene group, an ethylene group, a propylene group, and a trimethylene group; straight-chain or branched alkenylene groups having from 2 to 18 carbons, such as vinylene, 1-methylvinylene, propenylene, 1-butenylene, 2-butenylene, 1-pentenylene, and 2-pentenylene group; and straight-chain or branched alkynylene groups having from 2 to 18 carbons, such as ethynylene, propynylene, 3-methyl-1-propynylene, butynylene, and 1,3-butadiynylene group.

The alicyclic ring constituting the divalent alicyclic hydrocarbon group includes monocyclic hydrocarbon rings and polycyclic hydrocarbon rings. The polycyclic hydrocarbon includes spiro hydrocarbon rings, ring-aggregated hydrocarbon rings, crosslinked ring hydrocarbon rings, condensed ring hydrocarbon rings, and crosslinked-condensed ring hydrocarbon rings. Examples of the divalent alicyclic hydrocarbon group include groups obtained by removing two hydrogen atoms from the alicyclic structural formula described above.

Examples of the monocyclic hydrocarbon ring include $C_{3-12}$ cycloalkane rings such as cyclopropane, cyclobutane, cyclopentane, cyclohexane, cycloheptane, and cyclooctane; and $C_{3-12}$ cycloalkene rings such as cyclopentene and cyclohexene.

Examples of the spiro hydrocarbon ring include $C_{5-16}$ spiro hydrocarbon rings, such as spiro[4.4]nonane, spiro [4.5]decane, and spiro bicyclohexane.

Examples of the ring-aggregated hydrocarbon ring include ring-aggregated hydrocarbon rings containing two or more $C_{5-12}$ cycloalkane rings such as bicyclohexane.

Examples of the crosslinked ring hydrocarbon ring include bicyclic hydrocarbon rings, such as pinane, bornane, norpinane, norbornane, norbornene, bicycloheptane, bicycloheptene, and bicyclooctane (bicyclo[2.2.2]octane, and bicyclo[3.2.1]octane); tricyclic hydrocarbon rings, such as homobredane, adamantane, tricyclo[5.2.1.0$^{2,6}$]decane, and tricyclo[4.3.1.1$^{2,5}$]undecane; tetracyclic hydrocarbon rings, such as tetracyclo[4.4.0.1$^{2,5}$0.1$^{7,10}$]dodecane, and perhydro-1,4-methano-5,8-methanonaphthalene.

Examples of the condensed cyclic hydrocarbon ring include condensed rings in which a plurality cycloalkane rings having from 5 to 8 members is condensed, such as perhydronaphthalene (decalin), perhydroanthracene, perhydrophenanthrene, perhydroacenaphthene, perhydrofluorene, perhydroindene, and perhydrophenalene.

Examples of the crosslinked-condensed cyclic hydrocarbon ring include dimers of dienes (for example, dimers of cycloalkadienes such as cyclopentadiene, cyclohexadiene, and cycloheptadiene), and hydrogenated products thereof.

Examples of the divalent aromatic hydrocarbon group include arylene groups having from 6 to 18 carbons, such as a phenylene group, a biphenylene group, and a naphthylene group.

The hydrocarbon group described above may have various substituents [e.g. halogen atoms, an oxo group, substituted oxy groups (e.g. alkoxy groups, aryloxy groups, aralkyloxy groups, and acyloxy groups), a carboxyl group, substituted oxycarbonyl groups (alkoxycarbonyl groups, aryloxycarbonyl groups, and aralkyloxycarbonyl groups), substituted or unsubstituted carbamoyl groups, a cyano group, a nitro group, substituted or unsubstituted amino groups, a sulfo group, and heterocyclic groups]. The carboxyl group may be protected by a protecting group that is commonly used in the field of organic synthesis. Furthermore, an aromatic or non-aromatic heterocyclic ring may be condensed to an alicyclic ring constituting an alicyclic hydrocarbon group or to an aromatic ring constituting an aromatic hydrocarbon group.

The heterocyclic ring that constitutes a divalent heterocyclic group include an aromatic heterocyclic ring and a non-aromatic heterocyclic ring, and examples include heterocyclic rings containing an oxygen atom as a heteroatom (e.g. 4-membered rings, such as an oxetane ring; 5-membered rings, such as a furan ring, a tetrahydrofuran ring, an oxazole ring, an isoxazole ring, and a γ-butyrolactone ring; 6-membered rings, such as a 4-oxo-4H-pyran ring, a tetrahydropyran ring, and a morpholine ring; condensed rings, such as a benzofuran ring, an isobenzofuran ring, a 4-oxo-4H-chromene ring, a chroman ring, and an isochroman ring; crosslinked rings, such as a 3-oxatricyclo[4.3.1.1$^{4,8}$]undecan-2-one ring and a 3-oxatricyclo[4.2.1.0$^{4,8}$]nonan-2-one ring), heterocyclic rings containing a sulfur atom as a heteroatom (e.g. 5-membered rings, such as a thiophene ring, a thiazole ring, an isothiazole ring, and a thiadiazole ring; and 6-membered rings, such as a 4-oxo-4H-thiopyran ring; condensed rings, such as a benzothiophene ring), and heterocyclic rings containing a nitrogen atom as a heteroatom (e.g. 5-membered rings, such as a pyrrole ring, a pyrrolidine ring, a pyrazole ring, an imidazole ring, and a triazole ring; 6-membered rings, such as a pyridine ring, a pyridazine ring, a pyrimidine ring, a pyrazine ring, a piperidine ring, and a piperazine ring; condensed rings, such as an indole ring, an indoline ring, a quinoline ring, an acridine ring, a naphthryridine ring, a quinazoline ring, and a purine ring). The heterocyclic groups described above may also contain an alkyl group (e.g. $C_{1-4}$ alkyl groups, such as a methyl group and an ethyl group), cycloalkyl groups, and aryl groups (e.g. a phenyl group, and a naphthyl group), besides the substituent that may be included in the hydrocarbon group. Examples of the divalent heterocyclic group include groups obtained by removing two hydrogen atoms from the heterocyclic ring structural formula described above.

Examples of the linking group include a carbonyl group (—CO—), an ether bond (—O—), a thioether bond (—S—), an ester bond (—COO—), an amide bond (—CONH—), and a carbonate bond (—OCOO—).

Among these, $R^a$ is preferably a divalent hydrocarbon group or a divalent group in which two or more hydrocarbon groups are bonded to each other through a linking group; particularly preferably a divalent aliphatic hydrocarbon group or a divalent group in which two or more aliphatic hydrocarbon groups are bonded to each other through a linking group; most preferably a straight-chain or branched alkylene group having from 1 to 18 carbons or a group in which two or more straight-chain or branched alkylene groups having from 1 to 18 carbons are bonded to each other through a linking group; and especially preferably a straight-chain or branched alkylene group having from 1 to 6 carbons or a group in which two or more straight-chain or branched alkylene groups having from 1 to 6 carbons are bonded to each other through a linking group. Furthermore, the linking group is preferably an ether bond.

The monomer mixture preferably contains, as the compound (A), at least one compound selected from compounds represented by formulae (a-1-1) to (a-1-3) below, and most preferably includes at least a compound represented by Formula (a-1-1) below (=compound (a-1-1)).

[Chemical 2]

(a-1-1)

(a-1-2)

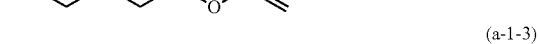

(a-1-3)

Compound (B)

The compound (B) is a compound having at least one oxetanyl group and at least one hydroxyl group, and is a cationically polymerizable monomer. Note that the compound (B) does not include compounds containing a vinyl ether group. A curable composition containing the compound (B) exhibits excellent curability, and a cured product obtained by curing the curable composition exhibits excellent adhesion to metals or glass.

Of these, the compound (B) is preferably a compound (b) having one oxetanyl group and one hydroxyl group because the obtained cured product exhibits both a high hardness and a low amount of curing shrinkage.

The compound (b) is represented by Formula (b-1) below, for example:

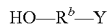
(b-1)

where $R^b$ represents a divalent hydrocarbon group, a divalent heterocyclic group, or a divalent group having these bonded to each other through a single bond or a linking group, and Y denotes an oxetanyl group.

Examples of the $R^b$ include the same examples as those described for $R^a$. Among these, $R^b$ is preferably a divalent hydrocarbon group, particularly preferably a divalent aliphatic hydrocarbon group, most preferably a linear or branched alkylene group having from 1 to 18 carbon atoms, and above all, most preferably a linear or branched alkylene group having from 1 to 6 carbon atoms.

The monomer mixture preferably contains, as the compound (B), at least a compound represented by Formula (b-1-1) below (=compound (b-1-1)).

[Chemical 3]

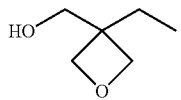
(b-1-1)

Compound (C)

The compound (C) is a compound represented by Formula (c) below, and is a cationically polymerizable monomer. Note that the compound (C) does not include compounds containing a vinyl ether group or an oxetanyl group. A curable composition containing the compound (C) exhibits a rapid curing property, and the cured product obtained by curing the curable composition has a high hardness.

[Chemical 4]

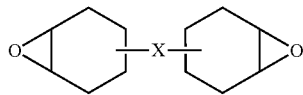
(c)

In Formula (c) above, X represents a single bond or a linking group. Examples of the linking group include divalent hydrocarbon groups, alkenylene groups in which at least a part or all of carbon-carbon double bonds are epoxidized, a carbonyl group (—CO—), an ether bond (—O—), an ester bond (—COO—), a carbonate bond (—OCOO—), an amide bond (—CONH—), and groups in which a plurality of these are linked.

Examples of the divalent hydrocarbon group include straight-chain or branched alkylene groups having from 1 to 18 carbons, and divalent alicyclic hydrocarbon groups having from 3 to 18 carbons. Examples of the linear or branched alkylene groups having from 1 to 18 carbon atoms include a methylene group, a methyl methylene group, a dimethyl methylene group, an ethylene group, a propylene group, and a trimethylene group. Examples of the divalent alicyclic hydrocarbon group having from 3 to 18 carbons include cycloalkylene groups (including cycloalkylidene groups), such as a 1,2-cyclopentylene group, a 1,3-cyclopentylene group, a cyclopentylidene group, a 1,2-cyclohexylene group, a 1,3-cyclohexylene group, a 1,4-cyclohexylene group, and a cyclohexylidene group.

For the alkenylene group, in which at least a part or all of carbon-carbon double bonds are epoxidized (also referred to as "epoxidized alkenylene group"), examples of the alkenylene group include straight-chain or branched alkenylene groups having from 2 to 8 carbons, such as a vinylene group, a propenylene group, a 1-butenylene group, a 2-butenylene group, a butadienylene group, a pentenylene group, a hexenylene group, a heptenylene group, and an octenylene group. In particular, as the epoxidized alkenylene group, an alkenylene group in which all carbon-carbon double bonds are epoxidized is preferred, and an alkenylene group which has from 2 to 4 carbons and in which all carbon-carbon double bonds are epoxidized is more preferred.

In the cyclohexene oxide group of Formula (c) above, a substituent may be bonded. Examples of the substituent include halogen atoms, $C_{1-10}$ alkyl groups, $C_{1-10}$ alkoxy groups, $C_{2-10}$ alkenyloxy groups (excluding vinyl ether groups), $C_{6-14}$ aryloxy groups, $C_{7-18}$ aralkyloxy groups, $C_{1-10}$ acyloxy groups, $C_{1-10}$ alkoxycarbonyl groups, $C_{6-14}$ aryloxycarbonyl groups, $C_{7-18}$ aralkyloxycarbonyl groups, epoxy group-containing groups, $C_{1-10}$ acyl groups, isocyanate groups, sulfo groups, carbamoyl groups, and oxo groups.

Representative examples of the compounds represented by Formula (b') above include (3,4,3',4'-diepoxy)bicyclohexyl, bis(3,4-epoxycyclohexylmethyl) ether, 1,2-epoxy-1,2-bis(3,4-epoxycyclohexan-1-yl)ethane, 2,2-bis(3,4-epoxycyclohexan-1-yl)propane, 1,2-bis(3,4-epoxycyclohexan-1-yl)ethane, and compounds represented by Formulae (b'-1) to (b'-8) below. Note that L in Formula (c-5) represents an alkylene group having from 1 to 8 carbons (preferably a straight-chain or branched alkylene group having from 1 to 3 carbons, such as a methylene group, an ethylene group, a propylene group, and an isopropylene group). In addition, $n^1$ and $n^2$ in Formulae (c-5) and (c-7) each represent an integer from 1 to 30.

[Chemical 5]

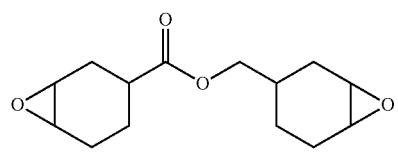
(c-1)

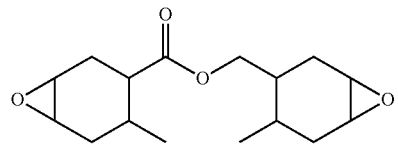
(c-2)

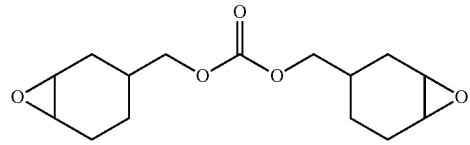
(c-3)

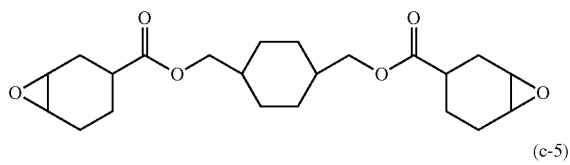
(c-4)

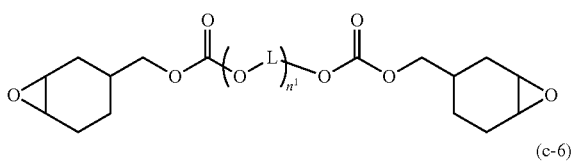
(c-5)

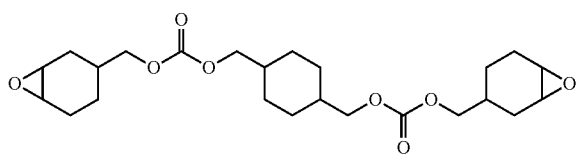
(c-6)

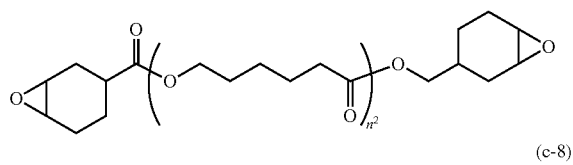
(c-7)

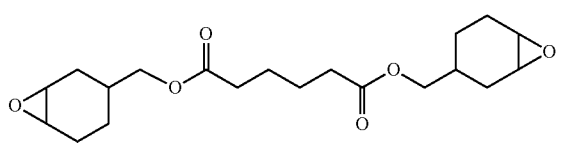
(c-8)

Of these, the monomer mixture preferably contains, as the compound (C), at least a compound that is expressed by formula (c) above and for which X in the formula is a group containing an ester bond (=compound (c')) because with such a compound, the curable composition quickly cures even in high humidity environments, and a cured product having a high hardness and excellent adhesion to metals or glass can be formed.

Compound (D)

The compound (D) has two or more vinyl ether groups bonded to an alicyclic skeleton or a non-aromatic heterocyclic skeleton, and is a cationically polymerizable monomer. Note that examples of the compound (D) do not include compounds containing a hydroxyl group or compounds containing an epoxy group. The curable composition containing the compound (D) exhibits a rapid curing property, and the cured product obtained by curing the curable composition has a high hardness.

Examples of the compound (D) include, for example, compounds represented by formula (d) below:

$$R^d-(O-CH=CH_2)_s \qquad (d)$$

where $R^d$ represents an s-valent alicyclic hydrocarbon group, an s-valent non-aromatic heterocyclic group, or an s-valent group having these bonded to each other through a single bond or a linking group, and s represents an integer of 2 or greater.

Examples of divalent alicyclic hydrocarbon groups and non-aromatic heterocyclic groups with respect to the s-valent alicyclic hydrocarbon group and non-aromatic heterocyclic group include the same examples that were given with respect to $R^a$ described above. Furthermore, examples of alicyclic hydrocarbon groups and non-aromatic heterocyclic groups having an s-valency of s≥3 include groups obtained by removing (s−2) hydrogen atoms from the structural formulae of the divalent alicyclic hydrocarbon groups or non-aromatic heterocyclic groups.

The s-valent alicyclic hydrocarbon groups or non-aromatic heterocyclic groups may have a substituent (for example, an alkyl group having from 1 to 3 carbon atoms).

Examples of the compound in which $R^d$ in formula (d) above is an s-valent non-aromatic heterocyclic group (=compound (d)) include a compound represented by formula (d-1) below and a compound represented by formula (d-2) below.

[Chemical 6]

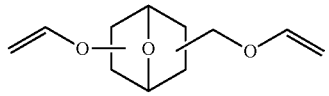
(d-1)

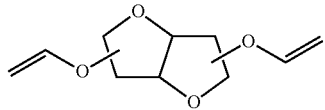
(d-2)

Examples of the compound in which $R^d$ in Formula (d) above is an s-valent alicyclic hydrocarbon group (=compound (d')) include cyclohexane divinyl ether and cyclohexane dimethanol divinyl ether.

Of these, the monomer mixture preferably contains, as the compound (D), a compound in which two or more vinyl ether groups are bonded to a non-aromatic heterocyclic skeleton and/or a compound in which two or more vinyl ether groups are bonded to an alicyclic skeleton, and particularly preferably contains at least a compound in which two or more vinyl ether groups are bonded to a non-aromatic heterocyclic skeleton.

The monomer mixture preferably contains, as the compound (D), at least the compound (d), and particularly preferably contains at least a compound represented by Formula (d-1) above and/or a compound represented by Formula (d-2) above.

Compound (E)

The compound (E) is a compound having two or more oxetanyl groups. Note that the compound (E) does not include a compound containing a hydroxyl group, a compound containing an epoxy group, or a compound containing a vinyl ether group. A curable composition containing the compound (E) exhibits excellent curability, and a cured product obtained by curing the curable composition exhibits excellent adhesion to metals or glass.

Examples of the compound (E) include compounds represented by Formula (e) below:

$$R^e-(Y)_t \qquad (e)$$

where $R^e$ denotes a t-valent organic group, Y denotes an oxetanyl group, and t denotes an integer of 2 or greater.

The t-valent organic group in the $R^e$ includes a t-valent hydrocarbon group, a t-valent heterocyclic group, and a t-valent group having two or more of these bonded to each other through a single bond or a linking group.

Examples of the t-valent hydrocarbon groups and the t-valent heterocyclic groups include the divalent hydrocarbon groups and divalent heterocyclic groups with respect to $R^a$ described above, and t-valent groups corresponding thereto. Examples of the linking group include the same examples given for linking groups with respect to $R^a$ described above. Among these, ether bonds are preferable as the linking group. These groups may have substituents, and examples of the substituents include the same examples given as substituents that may be included in the hydrocarbon groups with respect to $R^a$.

The t denotes an integer of 2 or greater, for example, an integer from 2 to 5, and is preferably 2.

Of these, the monomer mixture preferably contains, as the compound (E), at least a compound having two oxetanyl groups (for example, a compound for which t in formula (e) is 2), and particularly preferably contains a compound represented by formula (e-1) below and/or a compound represented by formula (e-2) below.

[Chemical 7]

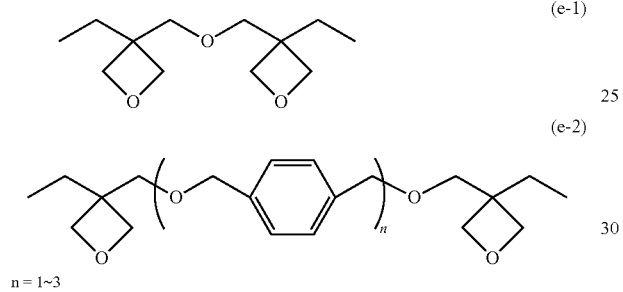

$n = 1\sim 3$

Commercially available products such as "Arone Oxetane OXT-221" and "Arone Oxetane OXT-121" (both available from Toagosei Co., Ltd.) for example can be used as the compound (E).

Other Cationically Polymerizable Monomers

In addition to the above compounds (A) to (E), the monomer mixture according to an embodiment of the present invention may contain one or more types of other cationically polymerizable monomers.

The other cationically polymerizable monomers are preferably monomers having two or more cationically polymerizable groups (for example, groups selected from vinyl ether groups, oxetanyl groups, and epoxy groups), that is, multifunctional cationically polymerizable monomers are preferable from the viewpoint of having excellent curability, and examples include the following compounds.

(1) Compounds having three or more alicyclic epoxy groups (2) Compounds having an alicyclic epoxy group and a glycidyl ether group (3) Compounds having two or more glycidyl ether groups (4) Compounds having two or more ethylene oxide groups (5) Compounds wherein two or more vinyl ether groups are bonded to an aliphatic hydrocarbon group or an alicyclic hydrocarbon group Examples of the above compound (1) having three or more alicyclic epoxy groups include compounds represented by Formulae (1-1) and (1-2) below. In the formulae, $n^3$ to $n^8$ each represent an integer from 1 to 30.

[Chemical 8]

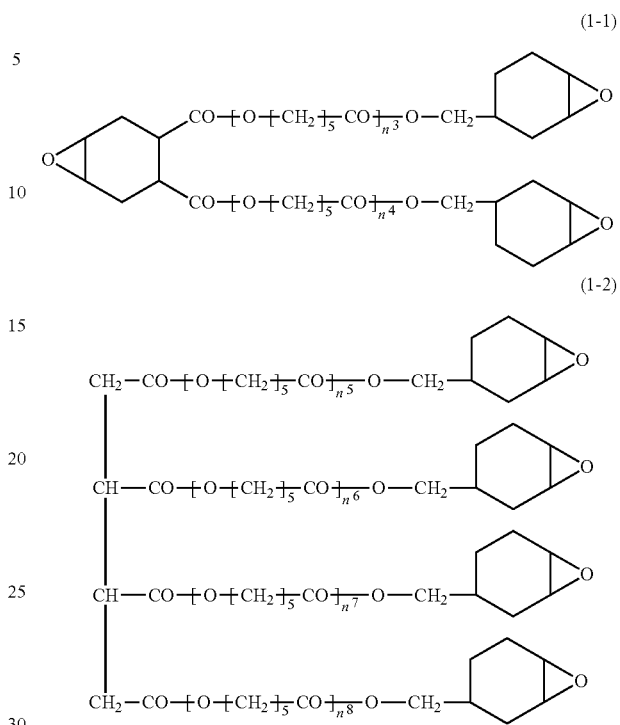

Examples of the above compound (2) having an alicyclic epoxy group and a glycidyl ether group include a compound represented by Formula (2-1) below.

[Chemical 9]

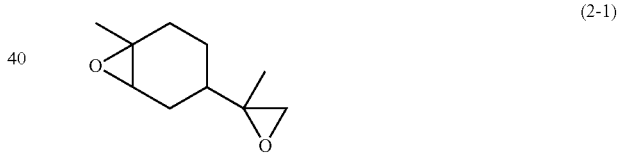

Examples of the above compound (3) having two or more glycidyl ether groups include bisphenol A-type epoxy compounds, bisphenol F-type epoxy compounds, bisphenol type epoxy compounds, phenol novolac type epoxy compounds, cresol novolac type epoxy compounds, and other such aromatic epoxy compounds; hydrogenated bisphenol A-type epoxy compounds, hydrogenated bisphenol F-type epoxy compounds, hydrogenated bisphenol type epoxy compounds, hydrogenated phenol novolac type epoxy compounds, hydrogenated cresol novolac type epoxy compounds, and other such alicyclic epoxy compounds; and compounds represented by Formulae (3-1) to (3-5), trimethylolethane triglycidyl ether, pentaerythritol tetraglycidyl ether, glycerin triglycidyl ether, dipentaerythritol hexaglycidyl ether, and other such aliphatic epoxy compounds.

[Chemical 10]

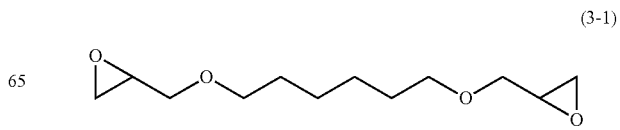

-continued

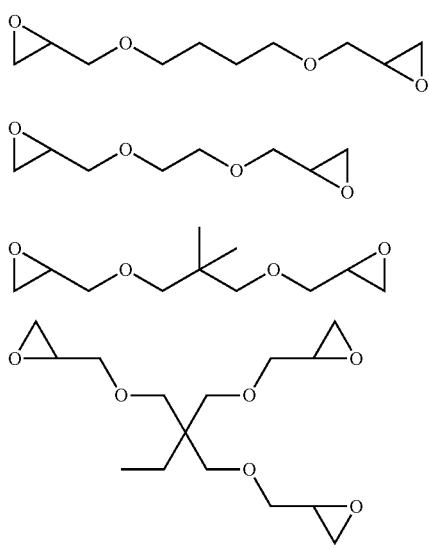

(3-2)

(3-3)

(3-4)

(3-5)

Examples of the above compound (4) having two or more ethylene oxide groups include compounds represented by Formula (4-1) below.

[Chemical 11]

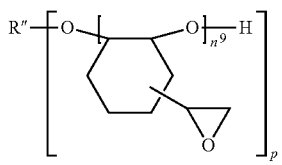

(4-1)

In Formula (4-1), R" is a group for which p hydroxyl groups has been removed from the structural formula of a p-hydric alcohol (p-valent organic group), and p and $n^9$ each represent a natural number. Examples of the p-hydric alcohol [R"(OH)$_p$] include polyhydric alcohols (polyhydric alcohols having from 1 to 15 carbon atoms, etc.) such as 2,2-bis(hydroxymethyl)-1-butanol. In the formula, p is preferably from 1 to 6, and $n^9$ is preferably from 1 to 30. In the case where p is 2 or greater, $n^9$ moieties of a group within [ ] (within the outer square brackets) may be the same or different. Specific examples of the compound represented by Formula (4-1) above include 1,2-epoxy-4-(2-oxiranyl)cyclohexane adduct of 2,2-bis(hydroxymethyl)-1-butanol [e.g. trade name: "EHPE3150" (available from Daicel Corporation)].

Examples of the compound (5) in which two or more vinyl ether groups are bonded to an aliphatic hydrocarbon group or an alicyclic hydrocarbon group include 1,4-butanediol divinyl ether, ethylene glycol divinyl ether, diethylene glycol divinyl ether, triethylene glycol divinyl ether, and cyclohexane dimethanol divinyl ether.

Monomer Mixture and Method for Producing the Same

The monomer mixture according to an embodiment of the present invention contains two or more types of cationically polymerizable monomers, and contains at least the compound (A), the compound (B), and the compound (C) as the cationically polymerizable monomers.

In addition to the compounds (A), (B), and (C), the monomer mixture according to an embodiment of the present invention can also contain the compound (D) and/or compound (E) described above as cationically polymerizable monomers.

The total content of the compound (A), the compound (B), and the compound (C) is 50 wt. % or greater of the total amount of the monomer mixture (or the total amount of cationically polymerizable monomers included in the monomer mixture), and from the viewpoint of achieving particularly excellent curability in high humidity environments, the total content thereof is preferably 55 wt. % or greater, particularly preferably 60 wt. % or greater, and most preferably 65 wt. % or greater. Moreover, the total content of the compound (A), the compound (B), and the compound (C) is preferably 90 wt. % or less of the total amount of the monomer mixture (or the total amount of cationically polymerizable monomers included in the monomer mixture) from the viewpoint of achieving particularly excellent curability in high humidity environments, and is particularly preferably 85 wt. % or less, most preferably 80 wt. % or less, and above all, most preferably 75 wt. % or less.

Furthermore, in the monomer mixture according to an embodiment of the present invention, a content [A] of the compound (A) and a content [B] of the compound (B) satisfy Relationship (1) below.

$$A/(A+B) \geq 0.3 \qquad (1)$$

That is, the proportion of the content [A] of the compound (A) in the total content [A+B] of the compound (A) and the compound (B) is 0.3 or greater.

Note that a value calculated by Relationship (1) above, or the proportion of the content [A] of the compound (A) in the total content [A+B] of the compound (A) and the compound (B) is preferably 0.5 or greater, particularly preferably 0.7 or greater, most preferably 0.8 or greater, and above all, most preferably 0.85 or greater from the viewpoint of particularly excelling in curability in high humidity environments. In addition, from the viewpoint of particularly excelling in adhesion to metals and glass, the proportion thereof is preferably less than 1.0, particularly preferably 0.95 or less, and most preferably 0.90 or less.

The total content [A+B] of the compound (A) and the compound (B) is, for example, from 20 to 55 wt. % of the total amount of the monomer mixture (or the total amount of cationically polymerizable monomers included in the monomer mixture), and from the viewpoint of particularly excelling in adhesion to metals and glass, the total content [A+B] is preferably greater than 30 wt. % and not more than 55 wt. %, and is particularly preferably from 32 to 55 wt. %. In addition, from the viewpoints of particularly excelling in adhesion to metals and glass, and particularly excelling in curability in high humidity environments, the total content [A+B] is most preferably 32 wt. % or greater and less than 40 wt %, and above all, most preferably from 32 to 38 wt. %.

The content [A] of the compound (A) is, for example, from 10 to 45 wt. % of the total amount of the monomer mixture (or the total amount of cationically polymerizable monomers included in the monomer mixture), and from the viewpoint of particularly excelling in adhesion to metals or glass, the content [A] is preferably from 15 to 40 wt. %, particularly preferably from 20 to 40 wt. %, most preferably from 25 to 35 wt. %, and above all, most preferably greater than 25 wt. % and not greater than 35 wt. %.

The content of the compound (a-1-1) is, for example, from 10 to 45 wt. % of the total amount of the monomer mixture (or the total amount of cationically polymerizable monomers included in the monomer mixture), and from the viewpoint of particularly excelling in adhesion to metals or glass, the content [A] is preferably from 15 to 40 wt. %, particularly preferably from 20 to 40 wt. %, most preferably from 25 to 35 wt. %, and above all, most preferably greater than 25 wt. % and not more than 35 wt. %.

Furthermore, from the viewpoint of particularly excelling in adhesion to metals or glass, the total content of the cationically polymerizable monomers containing a hydroxyl group is preferably, for example, from 20 to 55 wt. % of the total amount of the monomer mixture (or the total amount of the cationically polymerizable monomers included in the monomer mixture), and is more preferably from 23 to 45 wt. %, even more preferably greater than 25 wt. % and not greater than 45 wt. %, particularly preferably from 30 to 45 wt. %, and most preferably 30 wt. % or greater and less than 40 wt. %.

The content [B] of the compound (B) is, for example, from 1 to 15 wt. % of the total amount of the monomer mixture (or the total amount of cationically polymerizable monomers included in the monomer mixture), and from the viewpoint of particularly excelling in curability in high humidity environments, is preferably from 1 to 10 wt. %, particularly preferably from 2 wt. % to less than 10 wt. %, most preferably from 2 to 8 wt. %, and above all, most preferably from 3 to 8 wt. %.

The content of the compound (b-1-1) is, for example, from 1 to 15 wt. % of the total amount of the monomer mixture (or the total amount of cationically polymerizable monomers included in the monomer mixture), and from the viewpoint of particularly excelling in curability in high humidity environments, is preferably from 1 to 10 wt. %, particularly preferably from 2 wt. % to less than 10 wt. %, most preferably from 2 to 8 wt. %, and above all, most preferably from 3 to 8 wt. %.

The content of the compound (C) is, for example, from 15 to 45 wt. % of the total amount of the monomer mixture (or the total amount of cationically polymerizable monomers included in the monomer mixture), and from the viewpoint of particularly excelling in curability in high humidity environments, is preferably from 20 to 45 wt. %, particularly preferably from 25 to 45 wt. %, and most preferably from 30 to 40 wt. %.

The content of the compound (c') is, for example, from 15 to 45 wt. % of the total amount of the monomer mixture (or the total amount of cationically polymerizable monomers included in the monomer mixture), and from the viewpoint of particularly excelling in curability in high humidity environments, is preferably from 20 to 45 wt. %, particularly preferably from 25 to 45 wt. %, and most preferably from 30 to 40 wt. %.

The content of the compound (D) is, for example, from 1 to 10 wt. % of the total amount of the monomer mixture (or the total amount of cationically polymerizable monomers included in the monomer mixture), and from the viewpoint of particularly excelling in adhesion to metals or glass, the content thereof is preferably from 1 to 8 wt. %, particularly preferably from 2 to 7 wt. %, and most preferably from 3 to 6 wt. %.

The content of the compound (d) is, for example, from 1 to 10 wt. % of the total amount of the monomer mixture (or the total amount of cationically polymerizable monomers included in the monomer mixture), and from the viewpoint of particularly excelling in adhesion to metals or glass, the content thereof is preferably from 1 to 8 wt. %, particularly preferably from 2 to 7 wt. %, and most preferably from 3 to 6 wt. %.

The total content of the compound represented by Formula (d-1) and the compound represented by Formula (d-2) is, for example, from 1 to 10 wt. % of the total amount of the monomer mixture (or the total amount of cationically polymerizable monomers included in the monomer mixture), and from the viewpoint of particularly excelling in adhesion to metals or glass, the content thereof is preferably from 1 to 8 wt. %, particularly preferably from 2 to 7 wt. %, and most preferably from 3 to 6 wt. %.

The content of the compound (E) is, for example, from 15 to 40 wt. % of the total amount of the monomer mixture (or the total amount of cationically polymerizable monomers included in the monomer mixture), and from the viewpoint of particularly excelling in curability in high humidity environments, is preferably from 15 to 35 wt. %, particularly preferably from 20 to 35 wt. %, most preferably from 25 to 35 wt. %, and above all, most preferably 30 to 35 wt. %.

The total content of the compound represented by Formula (e-1) and the compound represented by Formula (e-2) is, for example, from 15 to 40 wt. % of the total amount of the monomer mixture (or the total amount of cationically polymerizable monomers included in the monomer mixture), and from the viewpoint of particularly excelling in curability in high humidity environments, is preferably from 15 to 35 wt. %, particularly preferably from 20 to 35 wt. %, most preferably from 25 to 35 wt. %, and above all, most preferably 30 to 35 wt. %.

The content of the compound represented by Formula (e-1) is, for example, from 15 to 40 wt. % of the total amount of the monomer mixture (or the total amount of cationically polymerizable monomers included in the monomer mixture), and from the viewpoint of particularly excelling in curability in high humidity environments, is preferably from 15 to 35 wt. %, particularly preferably from 20 to 35 wt. %, most preferably from 25 to 35 wt. %, and above all, most preferably from 30 to 35 wt. %.

The content of cationically polymerizable monomers having an oxetanyl group and/or an epoxy group (in particular, the total content of the compound (B), the compound (C), and the compound (E)) is, for example, from 50 to 90 wt. % of the total amount of the monomer mixture (or the total amount of cationically polymerizable monomers included in the monomer mixture), and is more preferably from 55 to 90 wt. %, particularly preferably from 55 to 85 wt. %, and most preferably from 60 to 85 wt. %.

The content of the cationically polymerizable monomers having a vinyl ether group (in particular, the total content of the compound (A) and the compound (D)) is, for example, from 10 to 50 wt. % of the total amount of the monomer mixture (or the total amount of cationically polymerizable monomers included in the monomer mixture), and is more preferably from 15 to 45 wt. %, particularly preferably more than 20 wt. % and not greater than 45 wt. %, and most preferably from 25 to 45 wt. %.

The proportion of the total content of the compounds (A), (B), (C), (D), and (E) in the total amount of the monomer mixture according to an embodiment of the present invention is, for example, 75 wt. % or greater, preferably 80 wt. % or greater, particularly preferably 85 wt. % or greater, most preferably 90 wt. % or greater, and above all, most preferably 95 wt. % or greater. Therefore, the proportion of the content (total amount in a case where two or more are included) of cationically polymerizable monomer(s) excluding the compounds (A), (B), (C), (D) and (E) (for example, the other cationically polymerizable monomers) in the total amount of the monomer mixture according to an embodiment of the present invention is, for example, 25 wt. % or less, preferably 20 wt. % or less, particularly preferably 15 wt. % or less, most preferably 10 wt. % or less, and above all, most preferably 5 wt. % or less.

The monomer mixture according to an embodiment of the present invention can be produced by uniformly mixing the compound (A), the compound (B), the compound (C), and other monomers as necessary using known device for mixing, such as a rotation/revolution-type agitating and defoaming device, a homogenizer, a planetary mixer, a roll mill, or a bead mill. Note that the components may be mixed at the same time or may be mixed sequentially.

A curable composition can be obtained by mixing a curing catalyst into the monomer mixture having the composition described above. The curable composition obtained in this manner exhibits excellent curability even in high humidity environments, and a cured product having excellent adhesion to glass or metals, and also of course to paper and plastic, can be formed. Therefore, the monomer mixture according to an embodiment of the present invention is useful as a raw material for a curable composition having the characteristics.

Curable Composition

The curable composition according to an embodiment of the present invention contains the monomer mixture and a curing catalyst.

The content of the monomer mixture is, for example, from 50 to 99.9 wt. %, and preferably from 70 to 98 wt. %, based on the total amount (100 wt. %) of the curable composition according to an embodiment of the present invention.

The curing catalyst includes known and commonly used photocationic polymerization initiators and photoradical polymerization initiators. The curable composition according to an embodiment of the present invention preferably contains at least a photocationic polymerization initiator as a curing catalyst. Furthermore, a photoradical polymerization initiator may be included together with the photocationic polymerization initiator, which may allow the curing reaction of the curable composition to proceed more efficiently, and may improve the hardness of the obtained cured product.

Examples of the photocationic polymerization initiator include diazonium salt-based compounds, iodonium salt-based compounds, sulfonium salt-based compounds, phosphonium salt-based compounds, selenium salt-based compounds, oxonium salt-based compounds, ammonium salt-based compounds, and bromine salt-based compounds. In the present invention, for example, commercially available products can be preferably used including products of the trade names Commercially available products, such as trade names "CPI-101A", "CPI-100P", and "CPI-110P" (available from San-Apro Ltd.), trade names "CYRACURE UVI-6990" and "CYRACURE UVI-6992" (available from Dow Chemical), trade name "UVACURE1590" (available from Daicel-Allnex Ltd.), trade names "CD-1010", "CD-1011", and "CD-1012" (available from Sartomer USA); trade name "Irgacure-264" (available from BASF), trade name "CIT-1682" (available from Nippon Soda Co., Ltd.), and trade name "PHOTOINITIATOR 2074" (available from Rhodia Japan, Ltd.), can be preferably used. One type alone or a combination of two or more types thereof can be used.

Examples of the photoradical polymerization initiator include 1-hydroxycyclohexylphenylketone, 2-hydroxy-2-methyl-1-phenylpropan-1-one, diethoxyacetophenone, 1-(4-isopropylphenyl)-2-hydroxy-2-methylpropan-1-one, 1-(4-dodecylphenyl)-2-hydroxy-2-methylpropan-1-one, 4-(2-hydroxyethoxy)-phenyl(2-hydroxy-2-propyl)ketone, 2-methyl-1-[4-(methylthio)phenyl]-2-morpholinopropan-1-one, benzoin, benzoin methyl ether, benzoin ethyl ether, benzoin isopropyl ether, benzoin-n-butyl ether, benzoin phenyl ether, benzil dimethylketal, benzophenone, benzoylbenzoic acid, methyl benzoylbenzoate, 4-phenylbenzophenone-4-methoxybenzophenone, thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone, 2,4,6-trimethylbenzoyldiphenylphosphine oxide, methylphenylglyoxylate, benzil, and camphorquinone. In an embodiment of the present invention, for example, commercially available products, such as trade names "Irgacure-184", "Irgacure-127", "Irgacure-149", "Irgacure-261", "Irgacure-369", "Irgacure-500", "Irgacure-651", "Irgacure-754", "Irgacure-784", "Irgacure-819", "Irgacure-907", "Irgacure-1116", "Irgacure-1173", "Irgacure-1664", "Irgacure-1700", "Irgacure-1800", "Irgacure-1850", "Irgacure-2959", "Irgacure-4043", "Darocur-1173", and "Darocur-MBF" (available from BASF), can be preferably used. One type alone or a combination of two or more types thereof can be used.

The used amount of the photocationic polymerization initiator is, for example, preferably from 0.1 to 20 parts by weight, more preferably from 0.5 to 10 parts by weight, and even more preferably from 1 to 10 parts by weight, per 100 parts by weight of the monomer mixture.

Furthermore, in the case where the photoradical polymerization initiator and the photocationic polymerization initiator are used together as the curing catalysts, the used amount of the photoradical polymerization initiator is preferably from 0.1 to 5 parts by weight, particularly preferably from 0.5 to 3 parts by weight, and most preferably from 0.5 to 2 parts by weight, per 100 parts by weight of the monomer mixture.

The curable composition according to an embodiment of the present invention may further contain a solvent; however, using no solvent or reducing the amount of the solvent is preferred from the viewpoints of enhancing dryness, applicability to a substrate that is easily deteriorated by a solvent, and prevention of odor generation due to volatilization of a solvent. The content of such a solvent is 10 wt. % or less, preferably 5 wt. % or less, and particularly preferably 1 wt. % or less, based on the total amount (100 wt. %) of the curable composition.

The curable composition according to an embodiment of the present invention may contain another component as necessary, besides the monomer mixture and the curing catalyst. Examples of other components include well-known and commonly used sensitizers (for example, acridine compounds, benzoflavins, perylenes, anthracenes, thioxanthone compounds, and laser dyes, etc.), sensitization auxiliary agents, surface adjusters (leveling agents, etc.), defoaming agents, antioxidants, stabilizers such as amines, silane coupling agents, fillers, and flame retardants.

In particular, in the case where the curable composition according to an embodiment of the present invention is used for application where curing is performed by irradiating UV-LED, a sensitizer and optionally a sensitization auxiliary agent are preferably included from the viewpoint of enhancing curability by improving the ultraviolet light absorption of the curing catalyst. The content of these (the total amount in the case where two or more types are included) is, for example, from 0.05 to 10 parts by weight, and preferably from 0.1 to 5 parts by weight, per 100 parts by weight of the monomer mixture.

Furthermore, as the sensitizer, for example, a compound represented by Formula (f-1) and a compound represented by Formula (f-2) are preferably used in combination from the viewpoint of enhancing curability while suppressing coloring of the formed cured product to a significantly low level. The combined ratio of these compounds [compound represented by Formula (f-1)/compound represented by Formula (f-2); weight ratio] is, for example, from 0.01 to 1.0, preferably from 0.1 to 0.5, and particularly preferably from 0.2 to 0.5. Note that, as the compound represented by Formula (f-1), for example, trade name "ANTHRACURE UVS-1331" (available from Kawasaki Kasei Chemicals Ltd.) can be used. Furthermore, as the compound represented by Formula (f-2), for example, trade name "ANTHRACURE UVS-581" (available from Kawasaki Kasei Chemicals Ltd.) can be used.

[Chemical 12]

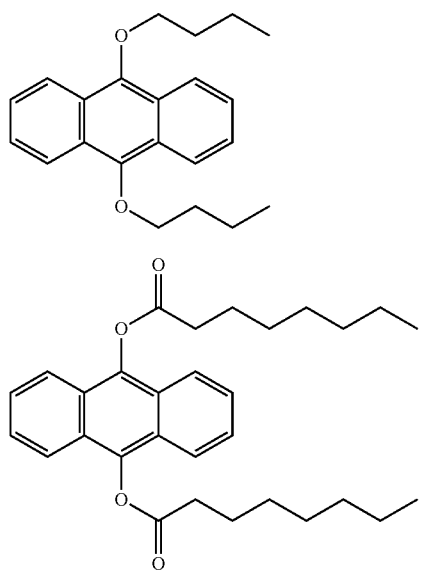

(f-1)

(f-2)

In the case where the curable composition according to an embodiment of the present invention is used as a color ink of an ultraviolet-curable inkjet ink, the curable composition preferably further contains a coloring material. The coloring material includes pigments and dyes. Note that, in the case where no coloring material is included, use as a clear ink is possible.

Pigments

As the pigment, a coloring material that is typically known as a pigment and that can be dispersed in the curable composition can be used without particular limitations. The average particle diameter of the pigment is, for example, preferably 300 nm or less from the viewpoint of achieving excellent discharge properties, jetting characteristics of ink, and printing reproducibility.

The pigment may also have magnetism, fluorescence, electric conductivity, or dielectric property in addition to color development and coloring characteristics. In this case, various functions can be imparted to the image.

Examples of the pigment that can be used include inorganic pigments, such as earthen pigments (e.g. ocher, amber); lapis lazuli; azurite; chalk; white wash; white lead; vermilion; ultramarine; viridian; cadmium red; carbonaceous pigments (e.g. carbon black, carbon refined, and carbon nanotubes); metal oxide pigments (e.g. iron black, cobalt blue, zinc oxide, titanium oxide, chromium oxide, and iron oxide); metal sulfide pigments (e.g. zinc sulfide); metal sulfates; metal carbonates (e.g. calcium carbonate, and magnesium carbonate); metal silicates; metal phosphates; and metal powders (e.g. aluminum powder, bronze powder, and zinc powder); organic pigments, such as insoluble azo pigments (e.g. monoazo yellow, monoazo red, monoazo violet, disazo yellow, disazo orange, and pyrazolone pigments); soluble azo pigments (e.g. azo yellow lake, and azo lake red); benzimidazolone pigments; β-naphthol pigments; naphthol AS pigment; condensed azo pigments; quinacridone pigments (e.g. quinacridone red, and quinacridone magenta); perylene pigments (e.g. perylene red, and perylene scarlet); perinone pigments (e.g. perinone orange); isoindolinone pigments (e.g. isoindolinone yellow, and isoindolinone orange); isoindoline pigments (e.g. isoindoline yellow); dioxazine pigments (e.g. dioxazine violet); thioindigo pigments; anthraquinone pigments; quinophthalone pigments (e.g. quinophthalone yellow); metal complex pigments; diketopyrrolopyrrole pigments; phthalocyanine pigments (e.g. phthalocyanine blue, and phthalocyanine green); and dye lake pigments; and fluorescent pigments, such as inorganic phosphors and organic phosphors. One type alone or a combination of two or more types thereof can be used.

Dyes

Examples of the dye include nitroaniline-based, phenyl monoazo-based, pyridone azo-based, quinophthalone-based, styryl-based, anthraquinone-based, naphthalimide azo-based, benzothiazolyl azo-based, phenyl disazo-based, and thiazolylazo-based dyes. One type alone or a combination of two or more types thereof can be used.

The content of the coloring material (the total amount in the case where two or more types are contained) is, for example, from 0.5 to 20 parts by weight, and preferably from 1 to 15 parts by weight, per 100 parts by weight of the monomer mixture.

In the case where the curable composition according to an embodiment of the present invention is used as a ultraviolet-curable inkjet ink, the curable composition preferably further contains a dispersant along with the coloring material from the viewpoint of improving the dispersibility of the dispersant. Examples of the dispersing agent include non-ionic surfactants, ionic surfactants, charging agents, polymeric dispersants (e.g. trade names "Solsperse 24000" and "Solsperse 32000", available from Avecia; "AJISPER PB821", "AJISPER PB822", "AJISPER PB824", "AJISPER PB881", "AJISPER PN411", and "AJISPER PN411", available from Ajinomoto Fine-Techno Co., Inc.). One type alone or a combination of two or more types thereof can be used.

The content of the dispersing agent is, for example, from 1 to 50 parts by weight, preferably from 3 to 30 parts by weight, and particularly preferably from 5 to 10 parts by weight, per 100 parts by weight of the coloring material.

The surface tension of the curable composition according to an embodiment of the present invention (at 30° C. and 1 atm) is, for example, from 10 to 50 mN/m. The viscosity of the curable composition according to an embodiment of the present invention [at 25° C. and shear rate of 100 (1/s)] is, for example, from 1 to 1000 mPa·s, preferably from 1 to 500 mPa·s, particularly preferably from 1 to 100 mPa·s, most preferably from 1 to 50 mPa·s, and especially preferably from 1 to 30 mPa·s. Therefore, the curable composition according to an embodiment of the present invention has excellent fluidity, and, for example, exhibits excellent discharge properties when discharged using an inkjet printer.

The curable composition according to an embodiment of the present invention can be quickly cured by irradiation with ultraviolet light to form a cured product even in high humidity environments (for example, a humidity of from 50 to 90% RH, preferably from 65 to 90% RH, particularly preferably from 70 to 90% RH, most preferably from 75 to 90% RH, and above all, most preferably from 80 to 90% RH), and even in the presence of oxygen such as in air. Therefore, in the case where the curable composition is used as an ultraviolet-curable inkjet ink, blur and generation of an odor can be prevented, and an ink coated film with excellent printing quality can be formed.

A light source for the ultraviolet light is not limited as long as the light source can apply light to the curable composition to generate an acid in the curable composition. For example, UV-LEDs, mercury lamps, such as low-, medium-, or high-pressure mercury lamps, mercury xenon lamps, metal halide lamps, tungsten lamps, arc lamps, excimer lamps, excimer lasers, semiconductor lasers, YAG lasers, laser systems using laser in combination with a nonlinear optical crystal, and high-frequency induction ultraviolet generators can be used. The quantity (integrated irradiance) of the ultraviolet light to be irradiated is, for example, from 10 to 5000 mJ/cm$^2$.

The curable composition according to an embodiment of the present invention may be further subjected to heat treatment after being irradiated with the ultraviolet light. The degree of curing can be further improved by performing a heating treatment. In the case where heat treatment is performed, the heating temperature is from approximately 40 to 200° C., and the heating time is from approximately 1 minute to 15 hours. Furthermore, after the irradiation of the ultraviolet light, the degree of curing can be also enhanced by allowing the curable composition to stand still at room temperature (20° C.) for approximately 1 to 48 hours.

The curable composition according to an embodiment of the present invention can form a cured product having excellent adhesion to a wide range of substrates. The cured product of the curable composition according to an embodiment of the present invention exhibits excellent adhesion to glass and metals (e.g. aluminum foil, copper foil, and SUS plate) in addition to plastics (e.g. polyethylene, polypropylene, polyethylene terephthalate (PET), vinyl chloride resins, polycarbonates, and ABS resins), natural rubber, butyl rubber, foams (e.g. polyurethane, and polychloroprene rubber), wood, woven fabric, nonwoven fabric, fabric, paper (e.g. woodfree paper, glassine paper, kraft paper, and Japanese paper), silicon wafer, ceramics; and composites of these. Therefore, typically, it has been necessary to perform pre-process (e.g. primer treatment) to a glass or metal surface to allow a cured product to be adhered onto the glass or metal; however, in the case where the curable composition according to an embodiment of the present invention is used, preprocess is not necessary, and the curable composition can be directly applied to the glass or metal to form a cured product having excellent adhesion by being cured. Thus, significantly excellent workability is achieved.

Therefore, the curable composition according to an embodiment of the present invention can be suitably used as ultraviolet-curable inkjet ink materials, adhesive agents, coating agents (or paints), encapsulants, civil engineering and construction materials, laminates and other electric/electronic components, photoresists, solder resists, interlayer components for multilayer printed circuit boards, insulating materials, repairing materials for concrete buildings, casting materials, sealants, and materials for optical shaping, optical materials such as lenses and optical waveguides.

Use of the curable composition according to an embodiment of the present invention as, for example, an ultraviolet-curable inkjet ink can suppress generation of an odor and can form an ink coated film that is significantly highly accurate and that has high hardness without particularly limiting the target to be printed even in the high humidity environments.

Cured Product

The cured product according to an embodiment of the present invention is a cured product of a curable composition containing a cationically polymerizable monomer. The cured product of the present invention excels in adhesion to a substrate, exhibits excellent adhesion to of course paper and plastic substrates, and also exhibits excellent adhesion to metals and glass substrates that have not been subjected to surface treatment (for example, a primer treatment, etc.) to improve adhesion.

The adhesion of the cured product according to an embodiment of the present invention to paper substrates, plastic substrates, metal substrates, and glass substrates is, for example, rated grade 0 to 2 in the 6 grade classification test using a cross cut method in accordance with JIS K 5600-5-6.

Two or more types of cationically polymerizable monomers may be included as cationically polymerizable monomers in the curable composition that forms the cured product according to an embodiment of the present invention, and among these cationically polymerizable monomers, the monomer mixture described above is preferably included from the viewpoint of exhibiting extremely excellent substrate adhesion.

The curable composition that forms the cured product according to an embodiment of the present invention preferably contains a curing catalyst together with the cationically polymerizable monomers.

The curable composition according to an embodiment of the present invention described above is particularly preferable as the curable composition. Therefore, the cured product according to an embodiment of the present invention is preferably a cured product of the curable composition according to an embodiment of the present invention described above.

Molded Article and Method for Producing the Same

The molded article according to an embodiment of the present invention is formed from the cured product of the curable composition described above. The molded article according to an embodiment of the present invention can be produced by ejecting the curable composition described above using inkjet method, and then curing the ejected curable composition.

The shape and the thickness of the molded article can be appropriately adjusted depending on the purpose of use.

When the curable composition is used for forming a molded article (e.g. three-dimensional molded article), a molded article having a desired shape can be easily and efficiently produced because the curable composition has rapid curability.

The molded article according to an embodiment of the present invention is formed from the cured product of the curable composition described above, and excels particularly in adhesion to metals or glass.

Structure and Method for Producing Same

The structure according to an embodiment of the present invention has a configuration including the cured product of the curable composition on a substrate surface. The structure can be produced, for example, by discharging the curable composition onto a substrate surface by an inkjet method, and then curing the discharged curable composition.

The shape and the thickness of the cured product can be appropriately adjusted depending on the purpose of use.

As the substrate, substrates described above can be used without particular limitation. The structure according to an embodiment of the present invention is formed by using the curable composition described above, and thus the structure has excellent adhesion to a substrate (not only to plastics but also to metals and glass), and the adhesion to a substrate is, for example, classified to be grade 0 to grade 2 in the 6-grade classification test of the Cross-cut method (based on JIS K 5600-5-6).

Furthermore, the curable composition described above has rapid curability, and thus the structure (e.g. structure having a printing or coating film formed from the cured product of the curable composition on a substrate surface) can be efficiently produced.

Furthermore, because the cured product of the curable composition excels particularly in adhesion to metals or glass, it is not necessary to perform a surface treatment such as primer treatment on the surface of the substrate, and the obtained structure does not have a surface treated layer such as a primer treatment between the substrate and the cured product.

EXAMPLES

Hereinafter, the embodiments of the present invention are described more specifically with reference to examples, however, the present invention is not limited by these examples.

Example 1

Components were mixed according to formulation shown in Table 1 (unit is in part by weight), and an ink was obtained. The viscosity of the obtained ink at 25° C. and a shear rate of 100 (1/s) was measured using an E-type viscometer (trade name "VISCOMETER TV-25", available from Toki Sangyo Co., Ltd.), and was found to be 12 mPa·s.

Examples 2 to 19, Comparative Examples 1 and 2

Each ink was obtained in the same manner as in Example 1 except for changing the formulation to the ones shown in Table 1 (unit is in part by weight), and an ink was obtained.

Evaluation of Curability in High Humidity Environments

The inks obtained in the examples and comparative examples were applied to a glass plate (trade name "S9112", available from Matsunami Glass Ind., Ltd.) or an aluminum plate (trade name "A1050P", available from As One Corporation) using a bar coater (#4) (coating film thickness: 5 μm), and then irradiated with 365 nm of light (illuminance: 1.5 W/cm$^2$) at a temperature of from 24 to 25° C. in an air atmosphere with a humidity level of 50 to 80% using, as a light source, an LED irradiator (trade name "UV-LED Processor LSS-05", available from CCR) [the irradiation amount (light exposure amount) for one time was set to 1 J/cm$^2$, and irradiation was repeated until tackiness was eliminated], and the curability was evaluated according to the number of irradiations.

Evaluation of Adhesion to Glass and Metal

The inks obtained in the examples and comparative examples were applied to a glass plate (trade name "S9112", available from Matsunami Glass Ind., Ltd.) or an aluminum plate (trade name "A1050P", available from As One Corporation) using a bar coater (#4) (coating film thickness: 5 μm), and then irradiated with light at a temperature of from 24 to 25° C. in an air atmosphere with a humidity level of 50% RH or 70% RH (irradiated with 365 nm of light using, as a light source, an LED irradiator (trade name "UV-LED Processor LSS-05", available from CCR) until tackiness was eliminated), and a cured product/substrate laminate (1) was obtained.

Furthermore, a cured product/substrate laminate (2) was obtained by subjecting the cured product/substrate laminate (1) obtained in a similar manner to post-baking (heating treatment for 10 minutes at a temperature of 120° C. using an oven).

The adhesion of the obtained cured product/substrate laminates (1) and (2) was evaluated by a method conforming to the "cross cut method" of JIS K 5600-5-6.

Specifically, a utility knife was used to form six cross-cuts (cut pieces) by cutting the cured product/substrate laminate from the cured product surface side in a lateral direction to reach the substrate.

Then, adhesive tape (trade name "Nichiban Tape No. 1", available from Nichiban Co., Ltd.) was affixed onto the cross cuts and peeled off, and the adhesion was evaluated with classification in 6 grades according to the following criteria.

6 Grade Classification

0: The edge of the cuts were completely smooth, and there was no peeling from any of the grid cells.

1: Small peeling of the coating film was present at the intersection points of the cuts. The areas affected at the cross-cut portion clearly did not exceed 5%.

2: Peeling of the coating film occurred along the edge of the cuts and/or at the intersection points. The areas affected at the cross-cut portion clearly exceeded 5% but did not exceed 15%.

3: Peeling of the coating film occurred partially or entirely along the edge of the cuts, and/or peeling of the coating film occurred partially or entirely at various portions of the grid cells. The areas affected at the cross-cut portion clearly exceeded 15% but did not exceed 35%.

4: Extensive peeling of the coating film occurred partially or entirely along the edge of the cuts, and/or peeling of the coating film occurred partially or entirely at several grid cells. The areas affected at the cross-cut portion clearly did not exceed 35%.

5: Any extent of peeling that could not be classified even as grade 4.

The results are summarized in the table below.

TABLE 1

| | | EXAMPLES | | | | | | | |
|---|---|---|---|---|---|---|---|---|---|
| | | 1 | 2 | 3 | 4 | 5 | 6 | 7 | 8 |
| Ink | ISBDVE | 5 | 5 | 4.7 | 5 | 5 | 5 | 5 | 5 |
| Composition | CHDMDVE | 0 | 0 | 0 | 0 | 0 | 0 | 0 | 0 |
| | TEGDVE | 0 | 0 | 0 | 0 | 0 | 0 | 0 | 0 |
| | HEVE | 30 | 30 | 28.6 | 25 | 20 | 25 | 10 | 15 |

TABLE 1-continued

| | | | | | | | | | | |
|---|---|---|---|---|---|---|---|---|---|---|
| | | 2021P | 35 | 35 | 33.3 | 35 | 40 | 40 | 40 | 40 |
| | | OXT101 | 5 | 5 | 4.7 | 5 | 5 | 0 | 15 | 10 |
| | | OXT221 | 25 | 25 | 28.7 | 30 | 30 | 30 | 30 | 30 |
| | | CPUI110P | 5 | 5 | 5 | 5 | 5 | 5 | 5 | 5 |
| | | Irg184 | 0 | 1 | 0 | 0 | 0 | 0 | 0 | 0 |
| | | UVS581 | 1 | 1 | 1 | 1 | 1 | 1 | 1 | 1 |
| | | UVS1331 | 0.3 | 0.3 | 0.3 | 0.3 | 0.3 | 0.3 | 0.3 | 0.3 |
| OH Compound Total | | | 35 | 35 | 33.3 | 30 | 25 | 25 | 25 | 25 |
| HEVE/(OXT101 + HEVE) | | | 0.86 | 0.86 | 0.86 | 0.83 | 0.80 | 1.00 | 0.40 | 0.60 |
| Curability (times) Substrate: Glass | Humidity | 50% | 1 | 1 | 1 | 1 | 1 | 1 | 1 | 1 |
| | | 60% | 1 | 1 | 1 | 1 | 1 | 1 | 1 | 1 |
| | | 70% | 1 | 1 | 1 | 1 | 1 | 1 | 1 | 2 |
| | | 80% | 2 | 2 | 1 | 1 | 1 | 1 | 2 | 2 |
| Glass Adhesion | Humidity 50% | UV | 0 | 0 | 0 | 5 | 5 | 5 | 3 | 3 |
| | | UV + Post Bake | 0 | 0 | 0 | 0 | 0 | 0 | 0 | 0 |
| | Humidity 70% | UV | 0 | 0 | 0 | 0 | 0 | 5 | 0 | 0 |
| | | UV + Post Bake | 0 | 0 | 0 | 0 | 0 | 0 | 0 | 0 |
| Curability (times) Substrate: aluminum | Humidity | 50% | 1 | 1 | 1 | 1 | 1 | 1 | 1 | 1 |
| | | 60% | 1 | 1 | 1 | 1 | 1 | 1 | 1 | 1 |
| | | 70% | 1 | 1 | 1 | 1 | 1 | 1 | 3 | 3 |
| | | 80% | 2 | 2 | 2 | 2 | 2 | 2 | >10 | >10 |
| Aluminum adhesion | Humidity 50% | UV | 0 | 0 | 0 | 5 | 5 | 5 | 5 | 5 |
| | | UV + Post Bake | 0 | 0 | 0 | 0 | 0 | 0 | 0 | 0 |
| | Humidity 70% | UV | 0 | 0 | 0 | 0 | 0 | 3 | 0 | 0 |
| | | UV + Post Bake | 0 | 0 | 0 | 0 | 0 | 3 | 0 | 0 |
| Determination | Curability under high humidity | | Excellent | Excellent | Excellent | Excellent | Excellent | Excellent | Good | Good |
| | Adhesion to glass and metal | | Excellent | Excellent | Excellent | Good | Good | Good | Good | Good |

| | | | EXAMPLES | | | | | | Comparative Examples | |
|---|---|---|---|---|---|---|---|---|---|---|
| | | | 9 | 10 | 11 | 12 | 13 | 14 | 1 | 2 |
| Ink Composition | | ISBDVE | 0 | 0 | 0 | 0 | 0 | 0 | 10 | 5 |
| | | CHDMDVE | 0 | 0 | 0 | 0 | 5 | 0 | 0 | 0 |
| | | TEGDVE | 0 | 0 | 0 | 0 | 0 | 5 | 0 | 0 |
| | | HEVE | 20 | 30 | 30 | 40 | 30 | 30 | 0 | 5 |
| | | 2021P | 40 | 30 | 40 | 30 | 35 | 35 | 40 | 40 |
| | | OXT101 | 10 | 10 | 10 | 10 | 5 | 5 | 20 | 20 |
| | | OXT221 | 30 | 30 | 20 | 20 | 25 | 25 | 30 | 30 |
| | | CPUI110P | 5 | 5 | 5 | 5 | 5 | 5 | 5 | 5 |
| | | Irg184 | 0 | 0 | 0 | 0 | 0 | 0 | 0 | 0 |
| | | UVS581 | 1 | 1 | 1 | 1 | 1 | 1 | 1 | 1 |
| | | UVS1331 | 0.3 | 0.3 | 0.3 | 0.3 | 0.3 | 0.3 | 0.3 | 0.3 |
| OH Compound Total | | | 30 | 40 | 40 | 50 | 35 | 35 | 20 | 25 |
| HEVE/(OXT101 + HEVE) | | | 0.67 | 0.75 | 0.75 | 0.80 | 0.86 | 0.86 | 0.00 | 0.20 |
| Curability (times) Substrate: Glass | Humidity | 50% | 1 | 1 | 1 | 1 | 1 | 1 | 1 | 1 |
| | | 60% | 1 | 1 | 1 | 1 | 1 | 1 | 1 | 1 |
| | | 70% | 1 | 3 | 3 | 3 | 4 | 6 | 2 | 1 |
| | | 80% | 1 | >10 | >10 | >10 | 8 | >10 | 3 | 3 |
| Glass Adhesion | Humidity 50% | UV | 0 | 0 | 0 | 0 | 0 | 5 | 5 | 5 |
| | | UV + Post Bake | 0 | 0 | 0 | 0 | 0 | 0 | 0 | 0 |
| | Humidity 70% | UV | 0 | 0 | 0 | 0 | 0 | 0 | 0 | 0 |
| | | UV + Post Bake | 0 | 0 | 0 | 0 | 0 | 0 | 0 | 0 |
| Curability (times) Substrate: aluminum | Humidity | 50% | 1 | 1 | 1 | 1 | 1 | 1 | 1 | 1 |
| | | 60% | 1 | 1 | 1 | 1 | 1 | 1 | 2 | 2 |
| | | 70% | 3 | 3 | 3 | 3 | 4 | 6 | 4 | 4 |
| | | 80% | >10 | >10 | >10 | >10 | 8 | >10 | >10 | >10 |
| Aluminum adhesion | Humidity 50% | UV | 5 | 0 | 0 | 0 | 0 | 0 | 5 | 5 |
| | | UV + Post Bake | 0 | 0 | 0 | 0 | 0 | 0 | 5 | 5 |
| | Humidity 70% | UV | 0 | 0 | 0 | 0 | 0 | 0 | 0 | 0 |
| | | UV + Post Bake | 0 | 0 | 0 | 0 | 0 | 0 | 0 | 0 |
| Determination | Curability under high humidity | | Good | Good | Good | Good | Excellent | Good | Good | Good |
| | Adhesion to glass and metal | | Good | Excellent | Excellent | Excellent | Excellent | Excellent | Poor | Poor |

TABLE 2

| | | EXAMPLES | | | | |
|---|---|---|---|---|---|---|
| | | 15 | 16 | 17 | 18 | 19 |
| Ink Composition | ISBDVE | 5 | 5 | 5 | 5 | 5 |
| | CHDMDVE | 0 | 0 | 0 | 0 | 0 |
| | TEGDVE | 0 | 0 | 0 | 0 | 0 |
| | HEVE | 30 | 30 | 30 | 30 | 30 |
| | 2021P | 35 | 35 | 35 | 35 | 35 |

TABLE 2-continued

| | | | EXAMPLES | | | | |
|---|---|---|---|---|---|---|---|
| | | | 15 | 16 | 17 | 18 | 19 |
| | OXT101 | | 5 | 5 | 5 | 5 | 5 |
| | OXT221 | | 25 | 25 | 25 | 25 | 25 |
| | CPUI110P | | 5 | 5 | 5 | 5 | 5 |
| | Irg184 | | 0 | 0 | 0 | 0 | 0 |
| | UVS581 | | 1 | 1 | 1 | 1 | 1 |
| | UVS1331 | | 0.3 | 0.3 | 0.3 | 0.3 | 0.3 |
| | Coloring | Pigment Blue 15:4 | 3.5 | 0 | 0 | 0 | 0 |
| | material | Pigment Red 122 | 0 | 3.5 | 0 | 0 | 0 |
| | | Pigment Yellow 155 | 0 | 0 | 3.5 | 0 | 0 |
| | | Pigment Black 7 | 0 | 0 | 0 | 3.5 | 0 |
| | | Pigment White 6 | 0 | 0 | 0 | 0 | 20 |
| | Dispersant | | 2 | 2 | 2 | 2 | 1 |
| OH Compound Total | | | 35 | 35 | 35 | 35 | 35 |
| HEVE/(OXT101 + HEVE) | | | 0.86 | 0.86 | 0.86 | 0.86 | 0.86 |
| Curability | Humidity | 50% | 1 | 1 | 1 | 1 | 1 |
| (times) | | 60% | 1 | 1 | 1 | 1 | 1 |
| Substrate: | | 70% | 2 | 2 | 2 | 2 | 1 |
| Glass | | 80% | 3 | 2 | 2 | 3 | 2 |
| Glass | Humidity | UV | 3 | 0 | 0 | 5 | 0 |
| Adhesion | 50% | UV + Post Bake | 0 | 0 | 0 | 0 | 0 |
| | Humidity | UV | 0 | 0 | 0 | 0 | 0 |
| | 70% | UV + Post Bake | 0 | 0 | 0 | 0 | 0 |
| Curability | Humidity | 50% | 1 | 1 | 2 | 2 | 1 |
| (times) | | 60% | 2 | 2 | 2 | 2 | 1 |
| Substrate: | | 70% | 2 | 2 | 2 | 2 | 2 |
| aluminum | | 80% | 2 | 2 | 2 | 3 | 3 |
| Aluminum | Humidity | UV | 0 | 0 | 0 | 0 | 0 |
| adhesion | 50% | UV + Post Bake | 0 | 0 | 0 | 0 | 0 |
| | Humidity | UV | 0 | 0 | 0 | 0 | 0 |
| | 70% | UV + Post Bake | 0 | 0 | 0 | 0 | 0 |
| Determination | Curability under high humidity | | Excellent | Excellent | Excellent | Excellent | Excellent |
| | Adhesion to glass and metals | | Excellent | Excellent | Excellent | Excellent | Excellent |

The various components in the table are described below.
Monomer
ISBDVE: isosorbide divinyl ether, trade name "ISB-DVE", available from Daicel Corporation
CHDMDVE: cyclohexane dimethanol divinyl ether
TEGDVE: triethylene glycol divinyl ether
HEVE: ethylene glycol monovinyl ether
2021P: 3,4-epoxycyclohexylmethyl(3,4-epoxy)cyclohexanecarboxylate, trade name "CELLOXIDE 2021P", available from Daicel Corporation
OXT101: 3-ethyl-3-hydroxymethyloxetane, trade name "ARON OXETANE OXT-101", available from ToaGosei Co., Ltd.
OXT221: bis[1-ethyl(3-oxetanyl)]methyl ether, product name "ARON OXETANE OXT-221", available from ToaGosei Co., Ltd.
Curing Catalyst
CPI-110P: mixture of diphenyl[4-(phenylthio)phenyl]sulfonium hexafluorophosphate and thiodi-p- phenylenebis(diphenylsulfonium) bis(hexafluorophosphate) (99.5/0.5), trade name "CPI-110P", available from San-Apro Ltd.
Irg184: 1-hydroxy-cyclohexyl-phenyl-ketone, trade name "Irgacure 184", available from BASF
Sensitizer
UVS-581: 9,10-di(capryloyloxy)anthracene, trade name "Anthracure UVS-581", available from Kawasaki Kasei Chemicals Ltd.
UVS1331: 9,10-dibutoxy anthracene, trade name "Anthracure UVS-1331", available from Kawasaki Kasei Chemicals Ltd.
Coloring Material
Pigment Blue 15: 4: copper phthalocyanine
Pigment Red 122: 3,10-dimethylquinacridone
Pigment Yellow 155: 2,2'-(1,4-phenylene-bis[imino(1-acetyl-2-oxoethane-2,1-diyl)azo]) bis (dimethyl terephthalate)
Pigment Black 7: carbon black
Pigment White 6: titanium dioxide
Dispersant
Trade name "Ajisper", polymeric pigment dispersant, available from Ajinomoto Fine-Techno Co., Inc.

As a summary of the above, the configurations of the present invention and variations thereof are described below.

[1] A monomer mixture containing two or more types of cationically polymerizable monomers; the monomer mixture containing, as the cationically polymerizable monomers, a compound (A) having a vinyl ether group and a hydroxyl group; a compound (B) having an oxetanyl group and a hydroxyl group; and a compound (C) represented by the following formula (c); wherein a total content of the compound (A), the compound (B), and the compound (C) is 50 wt. % or greater of the total amount of the monomer mixture, and a content [A] of the compound (A) and a content [B] of the compound (B) satisfy the following relationship (1).

$$A/(A+B) \geq 0.3 \quad (1)$$

[2] The monomer mixture according to [1], wherein the content [A] of the compound (A) is from 10 to 45 wt. % of the total amount of the monomer mixture (or the total amount of cationically polymerizable monomers included in the monomer mixture).

[3] The monomer mixture according to [1], wherein a content of a compound (a-1-1) is from 10 to 45 wt. % of the total amount of the monomer mixture (or the total amount of cationically polymerizable monomers included in the monomer mixture).

[4] The monomer mixture according to any one of [1] to [3], wherein the compound (B) is a compound represented by formula (b-1-1).

[5] The monomer mixture according to any one of [1] to [4], wherein the content [B] of the compound (B) is from 1 to 15 wt. % of the total amount of the monomer mixture (or the total amount of cationically polymerizable monomers included in the monomer mixture).

[6] The monomer mixture according to any one of [1] to [4], wherein the content [B] of a compound represented by formula (b-1-1) is from 1 to 15 wt. % of the total amount of the monomer mixture (or the total amount of cationically polymerizable monomers included in the monomer mixture).

[7] The monomer mixture according to any one of [1] to [6], wherein a content of the compound (C) is from 15 to 45 wt. % of the total amount of the monomer mixture (or the total amount of cationically polymerizable monomers included in the monomer mixture).

[8] The monomer mixture according to any one of [1] to [7], wherein the compound (C) is a compound represented by formula (c), and in formula (c), X is a group containing an ester bond.

[9] The monomer mixture according to any one of [1] to [8], further containing, as a cationically polymerizable monomer, a compound (D) having two or more vinyl ether groups bonded to an alicyclic skeleton or a non-aromatic heterocyclic skeleton (excluding compounds having hydroxyl groups), the content thereof being from 1 to 10 wt. % of the total amount of the monomer mixture.

[10] The monomer mixture according to any one of [1] to [8], containing, as a cationically polymerizable monomer, a compound expressed by formula (d-1) and/or a compound expressed by formula (d-2) at a content from 1 to 10 wt. % of the total amount of the monomer mixture.

[11] The monomer mixture according to any one of [1] to [10], containing, as a cationically polymerizable monomer, a compound (E) having two or more oxetanyl groups (excluding compounds having hydroxyl groups), the content thereof being from 15 to 40 wt. % of the total amount of the monomer mixture.

[12] A curable composition containing a monomer mixture described in any one of [1] to [11] and a curing catalyst.

[13] The curable composition according to [12], containing a sensitizer, or sensitizer and a sensitization auxiliary agent.

[14] The curable composition according to [12] or [13], containing a coloring material.

[15] The curable composition according to any one of [12] to [14], containing a dispersant.

[16] The curable composition according to any one of [12] to [15], wherein the curable composition is an ultraviolet-curable inkjet ink.

[17] The curable composition according to any one of [12] to [15], wherein the curable composition is a coating agent.

[18] The curable composition according to any one of [12] to [15], wherein the curable composition is an adhesive agent.

[19] A cured product of a curable composition described in any one of [12] to [18].

[20] A cured product of a curable composition containing a cationically polymerizable monomer, wherein adhesion to paper substrates, plastic substrates, metal substrates, and glass substrates is rated grade 0 to 2 in a 6 grade classification test through a cross-cut method in accordance with JIS K 5600-5-6.

[21] The cured product according to [20], wherein the curable composition containing the cationically polymerizable monomers is the curable composition described in any one of [12] to [15].

[22] A molded article comprising a cured product described in any one of [19] to [21].

[23] A method of producing a molded article containing: ejecting the curable composition described in [16] using inkjet method, then curing the ejected curable composition, and forming a molded article from a cured product of the curable composition.

[24] A structure having a cured product described in any one of [19] to [21] provided on a substrate surface.

INDUSTRIAL APPLICABILITY

The monomer mixture according to an embodiment of the present invention is useful as a raw material for a curable composition that is useful as, inter alia, an ultraviolet-curable inkjet ink, a coating agent, or an adhesive agent. When a curable composition obtained by blending a curing catalyst with the monomer mixture of the present invention is used as an ultraviolet-curable inkjet ink, the curable composition excels in discharge properties with low viscosity, and can be applied directly to a metal or glass surface even in high humidity conditions, and subsequently cured to thereby form an ink coating excelling in adhesion with extremely high precision.

The invention claimed is:

1. A monomer mixture comprising two or more types of cationically polymerizable monomers, the monomer mixture comprising, as the cationically polymerizable monomers: a compound (A) having one vinyl ether group and one hydroxyl group; a compound (B) having one oxetanyl group and one hydroxyl group; a compound (C) represented by Formula (c):

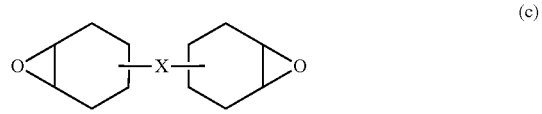

(c)

where X denotes a single bond or a linking group; and a compound (E) having two or more oxetanyl groups, excluding a compound having a hydroxyl group;

wherein a total content of the compound (A), the compound (B), and the compound (C) is 50 wt. % or greater of the total amount of the monomer mixture, and a content [A] of the compound (A) and a content [B] of the compound (B) satisfy Relationship (1);

$$A/(A+B) \geq 0.3 \qquad (1)$$

and the content of the compound (E) being from 15 to 40 wt. % of the total amount of the monomer mixture and the content [B] of the compound (B) being from 1 to 15 wt. % of the total amount of the monomer mixture.

2. The monomer mixture according to claim 1, further comprising, as a cationically polymerizable monomer, a compound (D) having two or more vinyl ether groups bonded to an alicyclic skeleton or a non-aromatic heterocyclic skeleton, excluding a compound having a hydroxyl group, the content of the compound (D) being from 1 to 10 wt. % of the total amount of the monomer mixture.

3. A curable composition comprising a monomer mixture described in claim 1 and a curing catalyst.

4. The curable composition according to claim 3, comprising a sensitizer, or a sensitizer and a sensitization auxiliary agent.

5. The curable composition according to claim 3, comprising a coloring material.

6. The curable composition according to claim 3, comprising a dispersant.

7. The curable composition according to claim 3, wherein the curable composition is a coating agent.

8. The curable composition according to claim 3, wherein the curable composition is an adhesive agent.

9. A cured product of the curable composition described in claim 3.

10. A cured product described in claim 8, wherein adhesion to a paper substrate, a plastic substrate, a metal substrate, and a glass substrate is rated grade 0 to 2 in a 6-grade classification test through a cross-cut method in accordance with JIS K 5600-5-6.

11. A molded article comprising the cured product described in claim 9.

12. A structure comprising the cured product described in claim 9 on a substrate surface.

\* \* \* \* \*